United States Patent

[11] 3,547,050

[72] Inventor Albert F. Verhoeven
  Grand Rapids, Mich.
[21] Appl. No. 761,098
[22] Filed Sept. 20, 1968
[45] Patented Dec. 15, 1970
[73] Assignee Werner Lehara, Inc.
  a corporation of Michigan

[54] DOUGH DEPOSITING MACHINE
  6 Claims, 6 Drawing Figs.
[52] U.S. Cl. .................................................... 107/27
[51] Int. Cl. .................................................... A23c 9/00
[50] Field of Search.......................................... 107/27,
  27(.1), 27(.2), 4, 4(.2), 4(.3), 14(.2), 15, 15(.1),
  15(.2), 15(.3), 15(.4), 54, 54(.2), 54(.28)

[56] References Cited
UNITED STATES PATENTS
| | | | |
|---|---|---|---|
| 472,765 | 4/1892 | Mitchell | 107/14X |
| 859,777 | 7/1907 | Markee | 107/14 |
| 1,522,594 | 1/1925 | Pointon | 107/15(.2) |
| 2,429,042 | 10/1947 | Bader | 107/27X |
| 2,854,170 | 9/1958 | Borgardt et al. | (107/27)UX |

Primary Examiner—Billy J. Wilhite
Assistant Examiner—Arthur O. Henderson
Attorney—Price, Heneveld, Huizenga & Cooper ABSTRACT: A dough-depositing machine for cookies and the like. The dough is pushed out through a nozzle from a hopper onto a cookie pan on a conveyor belt. A roller within the hopper cooperates with a reciprocating plunger to push the dough through the nozzles.

PATENTED DEC 15 1970 3,547,050

INVENTOR.
ALBERT F. VERHOEVEN
BY
ATTORNEYS

INVENTOR.
ALBERT F. VERHOEVEN
BY
ATTORNEYS

DOUGH DEPOSITING MACHINE

DISCLOSURE

This invention relates to a dough-depositing machine comprising a piston cooperative with at least one roller to push dough out of a nozzle.

Many machines have been devised to deposit cooky dough and the like onto cooky pans in the production of pastry and cookies.

Various types of dough-depositing machines employ hoppers for feeding the dough or other similar material and a die at the bottom of the hopper. The dough is pushed out of the hopper conventionally by longitudinally grooved rollers which rotate toward the nozzles at the bottom of the hopper.

Genich U.S. Pat. No. 2,969,026 discloses a candy-extruding machine in which a feed roller is used in combination with an expeller blade which is slidingly guided in a slot in a second roller to expel the confectionery material through dies adjacent the rollers.

Markee U.S. Pat No. 859,777 discloses a dough-sheeting machine in which a pair of rollers are used in conjunction with vertically reciprocable plungers below the rollers to push dough in sheet form through the bottom of the machine.

I have now discovered an improved dough-depositing machine in which a piston reciprocal within the machine controls the amount of dough expressed by a rotating roller through dies in the bottom of the machine.

By various aspects of this invention one or more of the following, or other, objects can be obtained.

It is an object of this invention to provide an improved dough-depositing machine having means for controlling the force with which the dough is expressed from dies in the machine.

It is a further object of this invention to provide an improved dough-depositing machine wherein a negative pressure can be created at the nozzle to positively cut off the flow of materials through the nozzle when desired and to sever the deposited dough from the dough in the nozzle.

Other aspects, objects, and the several advantages of this invention are apparent to one skilled in the art from a study of this disclosure, the drawings, and the appended claims.

According to the invention there is provided a machine for depositing dough and the like onto a surface for cooking. The machine comprises a hopper into which the dough is positioned for depositing. A delivery chamber is formed in the bottom of the hopper and a nozzle means is positioned at the bottom of the delivery chamber. Means are provided for intermittently discharging the dough from the delivery chamber and through the nozzle means. The nozzle can be a small round opening such as used for depositing cookies or can be a narrow slit such as used for expressing sheet materials.

The discharge means comprises at least one roller rotatable about a longitudinal axis within the hopper and positioned adjacent the delivery chamber, a piston reciprocable adjacent the roller toward and away from the nozzle means so as to diminish and enlarge the space between the roller as the piston reciprocates. The force on the material is increased by diminishing the distance between the piston and the roller. Conversely, the force on the material to discharge the same through the nozzle is decreased by increasing the distance between the roller and the piston.

Preferably, the piston is positioned above the roller relative to the delivery chamber so that as the piston is withdrawn away from the roller, a suction is created in the delivery chamber to thereby positively cut off the flow of dough out of the nozzle and to sever the deposited dough from the undeposited dough.

The invention will now be described with reference to the accompanying drawings in which.

Figure 1:
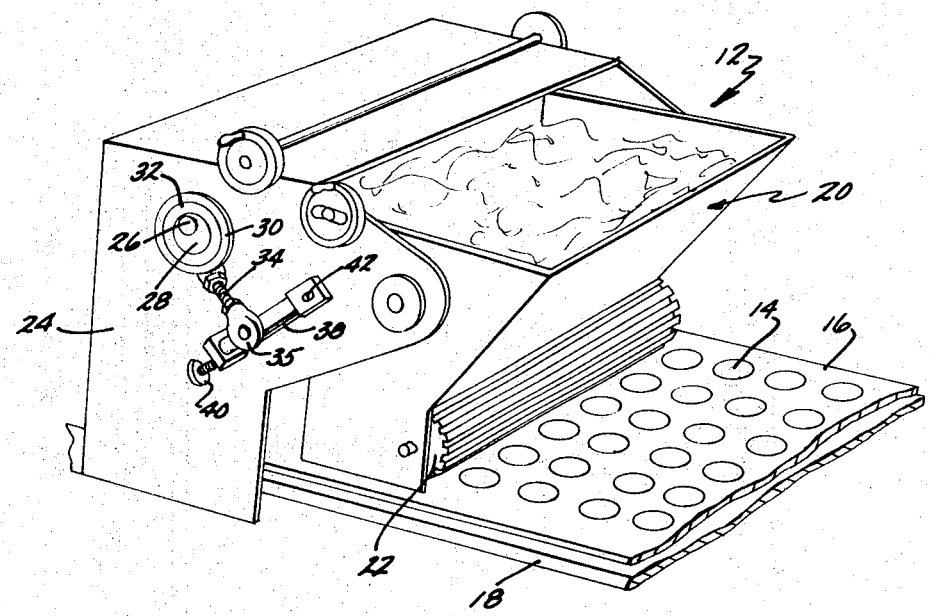
FIG. 1 is a perspective view of a dough-depositing machine according to the invention.
Figure 2:
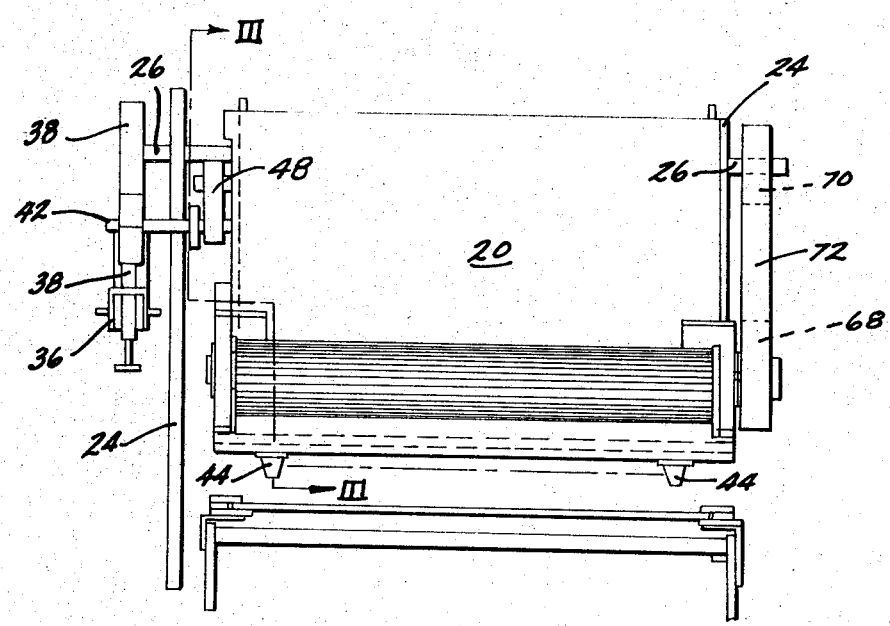
FIG. 2 is a front view of the depositing machine shown in FIG. 1.
Figure 5:
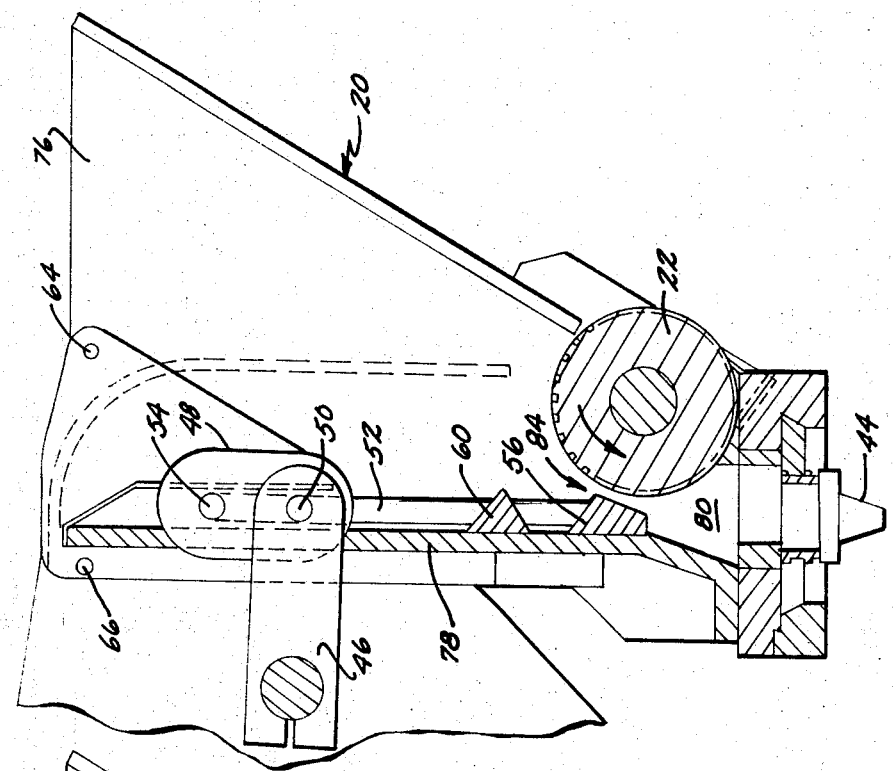
FIG. 5 is a view similar to FIG. 3 illustrating the piston in a position closest to the roller.
Figure 3:
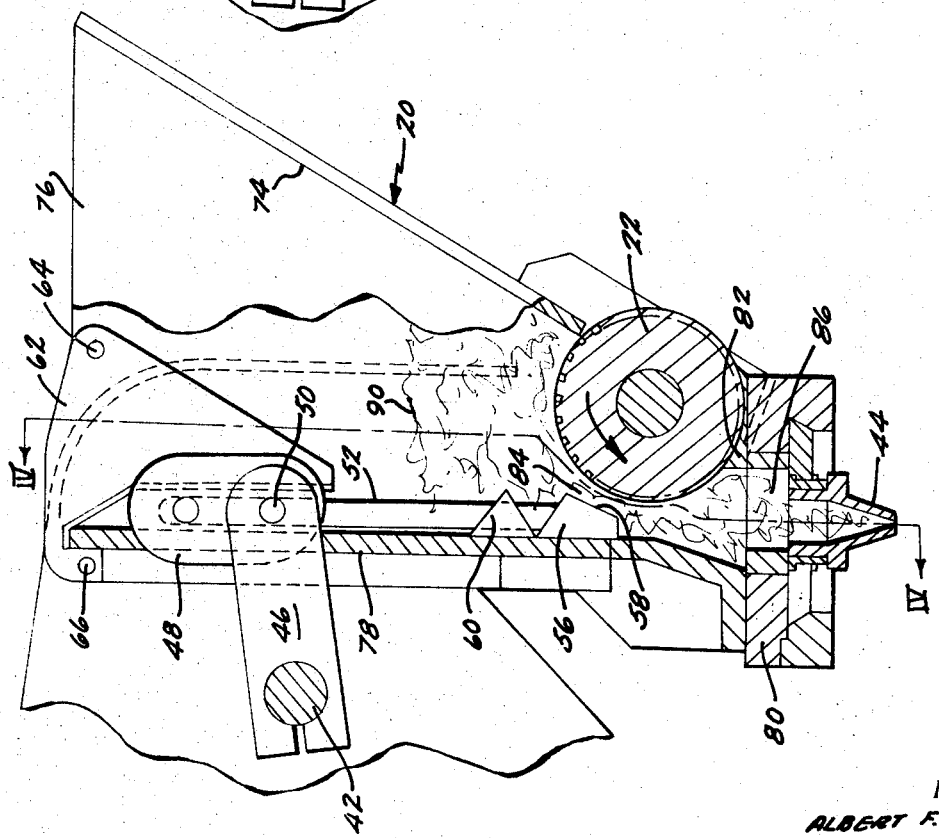
FIG. 3 is a side sectional view taken along lines III–III of FIG. 2.
Figure 4:
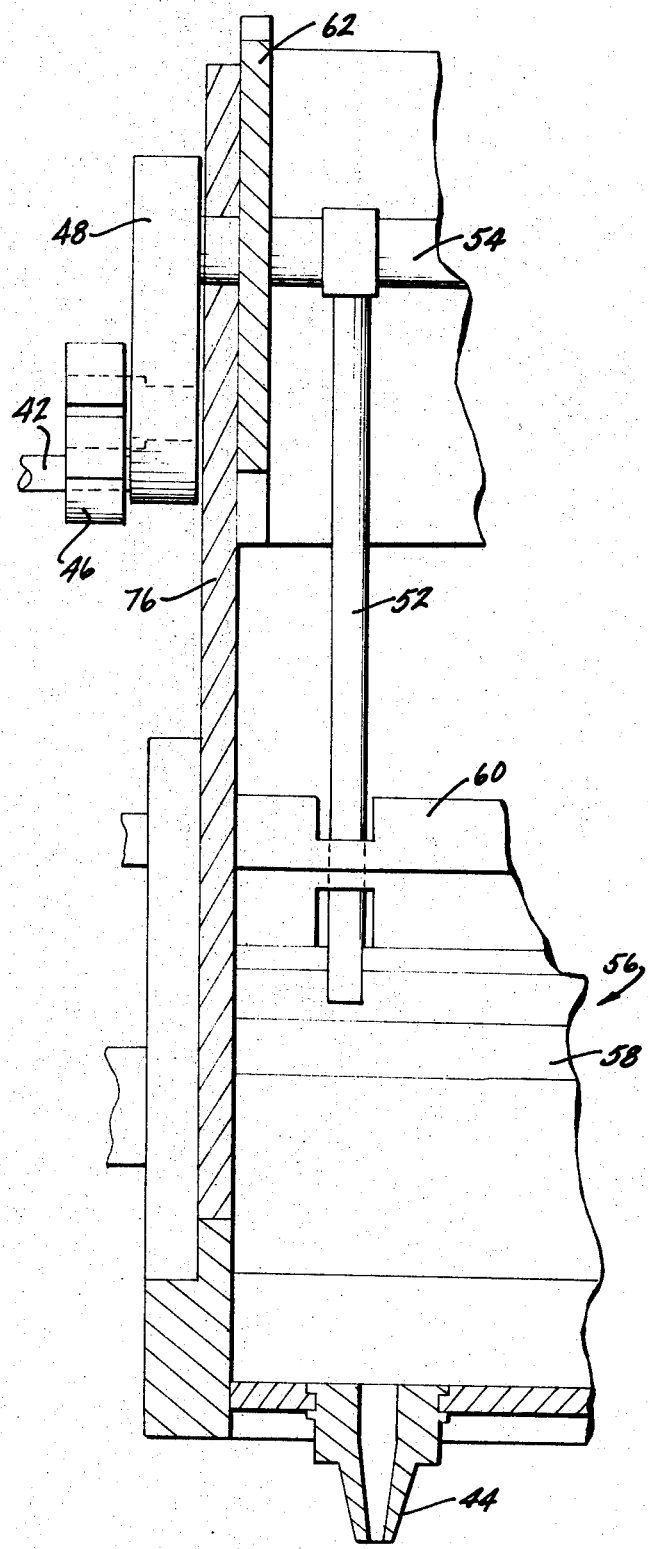
FIG. 4 is a sectional view taken along lines IV–IV of FIG. 3.

Referring now to the drawings, and to FIGS. 1—5 in particular, a dough-depositing machine 12 is positioned above a cooky sheet 16 on a conveyor 18. Cookies 14 are deposited onto the cooky sheet through a plurality of depositing cups 44. The dough-depositing machine has a hopper 20 and a longitudinally grooved roller 22 which is positioned within the hopper. A housing 24 is fixed to the hopper 20 and contains the power driving means for the machine.

A power shaft 26 extends out from the side of the housing 24 and is fixed to an eccentric 28. A ring 30 is concentrically mounted on the eccentric and is fixed to a linkage 34. A bearing ring 32 is positioned between the eccentric 28 and the ring 30. The linkage 34 has a forked end 36 which is fixed to an arm 38. The arm has an adjusting screw 40 which permits the point of attachment between the forked end 36 and the arm 38 to be changed. At the other end, the arm 38 is fixed to a shaft 42 which is journaled in the side of housing 24 and in the side of hopper 20. A second linkage 46 is fixed to shaft 42 between the side of housing 24 and the side of hopper 20. At the other end, the second link is rotatably attached to a third link 48 through a pin 50. The third link 48 is rotatably secured to a pin 54 which also rotatably engages the upper portion of piston rod 52. A piston 56 having an arcuate surface 58 adjacent roller 22 is fixed to the bottom of the piston rod 52. The piston rod extends through a stop guide 60 fixed to back wall 78 of hopper 20. The hopper also comprises a sloping front wall 74 and sidewalls 76.

A holding flange 62 is pinned at 66 to back wall 78 and at 64 to sidewall 76. The holding flange 62 provides a track between its inner edge and the back wall 78 for guiding the reciprocation of pin 54.

The holding flange 62 can be easily removed by removing pin 64 and swinging the flange 62 about pin 66. In this manner, he the piston and piston rod can be easily removed from the hopper for cleaning and repairs.

The roller 22 is continuously rotated by pulley wheel 68 fixed to the shaft of the roller, pulley wheel 70 fixed to the rotating power shaft 26 and pulley belt 72 which extends between the pulley wheels 68 and 70.

A space 84 is formed between the roller 22 and the piston 56. The rotation of roller 22 forces the dough within the hopper 20 into the space 84 when the piston 56 is close enough as illustrated, for example, in FIG. 5. The dough then passes into delivery passage 86 and out through depositing cups 44.

In the operation of the depositing machine, dough 90 within the hopper is forced between piston 56 and roller 22 when the piston is close to the roller. The amount of force on the dough tending to push the dough into delivery passage 86 increases as the space 84 between the piston 56 and the roller 22 decreases. The dough is expressed out through depositing cups 44 onto the cooky sheet 16. When a sufficient amount of dough has been deposited on the cooky sheet 16, the piston 56 is raised to increase the space 84 between roller 22 and piston 56, thereby decreasing the force on the dough 90 within the delivery passage 86. Further, the raising of piston 56 creates a vacuum in the delivery passage 86 tending to suck the dough within the delivery cup upwardly. The action severs the dough at the bottom tip of the delivery cup from that dough which has been deposited on the sheet. Thus, no separate cutoff means are required to sever the dough after a sufficient amount has been deposited on the cooky sheets.

The operation of the piston is as follows: as the eccentric 28 rotates on shaft 26, a reciprocal motion is imparted to the first link 34. This motion of link 34 causes the arm 38 to rotate back and forth about shaft 42, thereby causing the second link 46 to rotate back and forth about shaft 42. For example, the rotation of the shaft 42 in a counterclockwise direction will cause the third link 48 to raise the piston rod 52. Conversely, the clockwise rotation of shaft 42 will cause second link 46 to pull down on the third link 48 to pull the piston rod 52 downwardly.

Figure 6:
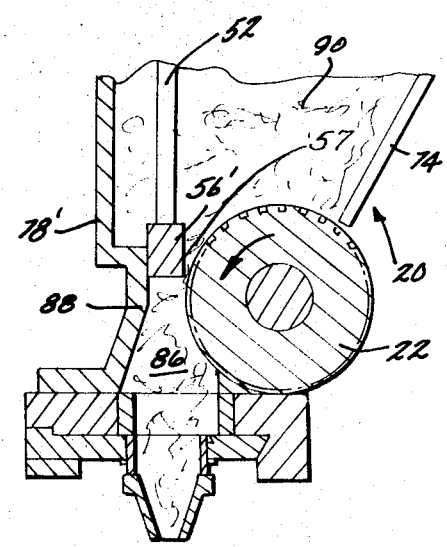
FIG. 6 is a schematic representation of a second embodiment of the invention.

A modified form of the invention is shown in FIG. 6. In this modification, no stop means for the piston has been provided and the piston 56' has an inner surface 57 adjacent the roller 22 which lies in a plane tangent to the outer surface of roller 22, which plane is parallel to the direction of reciprocation of the piston 56'. A guiding surface 88 is formed from an inwardly extended portion of a back wall 78' of the hopper 20. Dough 90 in the delivery passage 86 will be acted on by a force which is dependent on the space between roller 22 and piston 56'. The rotation of the roller 22 in the direction of the arrow shown in the drawing will tend to force the piston against guiding surface 88.

In operation, as the piston 56' moves down towards the depositing cups 44 and down towards the roller 22, the force on the dough 90 within the delivery passage 86 will increase thereby forcing the dough out through the depositing cups 44. When the piston is retracted, i.e. moved upwardly relative to the roller 22 and the depositing cups 44, the force on the dough in the delivery passage 86 diminishes and a suction is created within that passage thereby severing the dough at the bottom tip of the depositing cups 44 from that dough which has been expressed through the tips of the depositing cups.

Whereas the invention has been described with reference to certain embodiments, it is obvious that modifications can be made to the disclosed apparatus without departing from the scope of the invention. For example, a pair of rollers having a reciprocable piston between them could be employed instead of a single roller. Also, other means for imparting reciprocal movement to the piston can be devised without departing from the scope of the invention. Further, means can be provided for synchronizing the movement of the conveyor with the movement of the piston so that the conveyor is moved intermittently during the upward movement of the piston and so that the conveyor is stationary during the downward movement of the pistons.

I claim:

1. A machine for depositing dough and the like onto a surface comprising:
    a hopper having a delivery chamber in the bottom portion of said hopper and nozzle means at the bottom portion of said delivery chamber; and
    means for intermittently discharging dough through said nozzle means, said discharging means comprising:
    at least one roller rotatable about a longitudinal axis within said hopper adjacent said nozzle means;
    means for continuously rotating said roller towards said nozzle means so as to force dough through said nozzle means;
    a piston in said hopper positioned in a predetermined relationship with respect to said roller such that when said piston is in a first position said roller forces dough through said nozzle means, and when said piston is in a second position, the rotation of said roller is ineffective to push dough through said nozzle means; and
    means for continuously moving said piston between said first and second positions, thereby increasing and decreasing the force on the dough from said rotating roller at said nozzle means.

2. A machine according to claim 1 wherein said roller is longitudinally grooved.

3. A machine according to claim 1 further comprising means to selectively reciprocate said piston, said means comprising:
    a first shaft powered so as to be rotatable about a fixed longitudinal axis;
    an eccentric on said shaft;
    a first linkage fixed at one end to said eccentric so as to reciprocate away from said shaft as said eccentric turns;
    an arm connected at one end to another end of said first linkage;
    a second shaft rotatable about its longitudinal axis and fixed to another end of said arm;
    a second linkage fixed at one end to said shaft; and
    a third linkage rotatably fixed at one end to said second link and rotatably fixed at the other end to said piston so that reciprocatory motion of said first link, imparted by said eccentric, will cause oscillation of said arm about said second shaft, oscillation of said arm causes rotation of said second shaft which oscillates said second link, said second link adapted to reciprocate said piston through movement of said third link.

4. A machine according to claim 1 wherein said machine has an arcuate surface facing said roller.

5. A machine according to claim 4 wherein said arcuate surface has the same curvature as the outer curvature of said roller.

6. A machine according to claim 1 wherein an inner edge of said piston lies in a plane which is tangent to the outer edge of said roller, said plane being parallel to the direction of reciprocation of said piston.